United States Patent [19]

Yasui et al.

[11] Patent Number: 4,658,670

[45] Date of Patent: Apr. 21, 1987

[54] FINAL REDUCTION GEAR APPARATUS

[75] Inventors: Yasuyoshi Yasui; Hiroshi Hori, both of Toyota, Japan

[73] Assignee: Toyota Jidosha Kabushiki Kaisha, Toyota, Japan

[21] Appl. No.: 775,607

[22] Filed: Sep. 13, 1985

[30] Foreign Application Priority Data

Nov. 28, 1984 [JP] Japan .......................... 59-179392[U]

[51] Int. Cl.⁴ .......................... F16H 1/38; F16H 57/02
[52] U.S. Cl. ...................................... 74/710; 74/607; 277/11
[58] Field of Search ................... 74/607, 710; 384/477, 384/484; 277/11

[56] References Cited

U.S. PATENT DOCUMENTS

| | | | |
|---|---|---|---|
| 2,405,120 | 8/1946 | Evans | 277/11 |
| 2,546,969 | 4/1951 | Buckendale | 74/607 |
| 3,110,095 | 11/1963 | Peickii | 74/607 |
| 3,715,935 | 2/1973 | Ebey | 74/607 |
| 3,984,160 | 10/1976 | Sheldon et al. | 384/484 |
| 4,218,813 | 8/1980 | Cather, Jr. | 277/11 |
| 4,405,135 | 9/1983 | Ries | 277/11 |

Primary Examiner—Allan D. Herrmann
Assistant Examiner—John Malcolm White
Attorney, Agent, or Firm—Oblon, Fisher, Spivak, McClelland & Maier

[57] ABSTRACT

Outside of the oil seal attached to the side gear shaft position in the final reduction gear apparatus, a guide member is installed which has an inner diameter slightly larger than that of the main lip of the oil seal and has a guide surface concentric to the main lip; the side gear shaft is pushed along the guide surface of said guide member, whereby the interference between the side gear shaft and the main lip of the oil seal can be minimized, thus preventing damage to the main lip and assuring the normal function of the oil seal to prevent oil leakage; and the assembling of the side gear shaft is facilitated through exact and easy centering of the side gear shaft.

10 Claims, 6 Drawing Figures

FINAL REDUCTION GEAR APPARATUS

BACKGROUND OF THE INVENTION

1. Field of the Invention

The present invention relates to a side gear shaft fixture in the final reduction gear apparatus of a car.

2. Description of the Prior Art

A side gear shaft is fitted in the final reduction gear apparatus of a vehicle in which the gear assembly is housed within the differential carrier. At the side gear shaft position in the differential carrier an oil seal with a main lip surrounding the side gear shaft is usually provided to prevent oil leakage out of the differential carrier assembly. In assembling the side gear shaft into the final reduction gear apparatus, however, it is difficult to assure exact centering of the side gear shaft relative to the oil seal and as a consequence interference between the tip of the side gear shaft and the main lip of the oil seal is likely. When this interference is small, the rubber main lip can elastically deform while following the contour of the side gear shaft and thus no trouble occurs. When this interference exceeds an allowable limit, the tip of the side gear shaft is likely to damage the main lip. Damage to the main lip will cause the oil seal to lose its proper sealing ability and then the oil will be liable to leak out of the final reduction gear apparatus.

SUMMARY OF THE INVENTION

An object of the present invention is to provide such a structure of the final reduction gear apparatus such that it can assure exact centering of the side gear shaft relative to the opening for the side gear shaft in the differential carrier or its flange, thereby preventing possible damage to the main lip through interference between side gear shaft and the main lip of the oil seal.

Another object of the present invention is to provide such a structure of the final reduction gear apparatus that in assembling the side gear shaft the tip of the side gear shaft can be easily centered relative to the side gear shaft opening and thus the assembling of the side gear shaft can be facilitated.

To accomplish these objects, the final reduction gear apparatus according to the present invention includes an oil seal attached at the side gear shaft opening in the differential carrier which houses the gear assembly and equipped with a main lip contacting the periphery of the side gear shaft. A guide member is provided outside of said oil seal at the side gear shaft opening, said guide member having a slightly larger inner diameter than that of the main lip of the oil seal and a guide surface concentric to the main lip.

The guide surface of the guide member is desirably designed such that it has a surface parallel to the direction of insertion movement of the side gear shaft and a surface tapered in that direction.

In the final reduction gear apparatus of the present invention, in which said guide member is installed outside of the oil seal, the tip and the peripheral surface of the side gear shaft are guided by the guide surface of said guide member when the side gear shaft is pushed into the side gear shaft opening. Since the guide surface of said guide member is concentric to the main lip of the oil seal attached to the side gear shaft opening, the side gear shaft to be guided can also be held nearly concentric to the side gear shaft opening as well as to the main lip of the oil seal. And since the inner diameter of the guide member is only slightly larger than the inner diameter of the main lip of the oil seal, an interference, if any, between the main lip and the side gear shaft to be guided, will be small enough to fit into the allowable elastic deformation of the main lip.

Thus even if a spline and the like exists in the side gear shaft, the oil seal can properly function with no damage to the main lip.

Further, since the side gear shaft is guided by the guide surface concentric to the main lip of the oil seal, the side gear shaft can be easily and smoothly centered relative to the oil seal and the side gear shaft opening by merely being guided into the guide member.

Thus the present invention facilitates pushing of the side gear shaft into the side gear shaft opening and enhances the quality of assembly.

BRIEF DESCRIPTION OF THE DRAWINGS

The above objects, features and advantages of the present invention will become apparent and more readily appreciated from the following detailed description of exemplary embodiments of the present invention, taken in conjunction will the accompanying drawings, wherein.

DETAILED DESCRIPTION OF THE PREFERRED EMBODIMENTS

Figure 1:
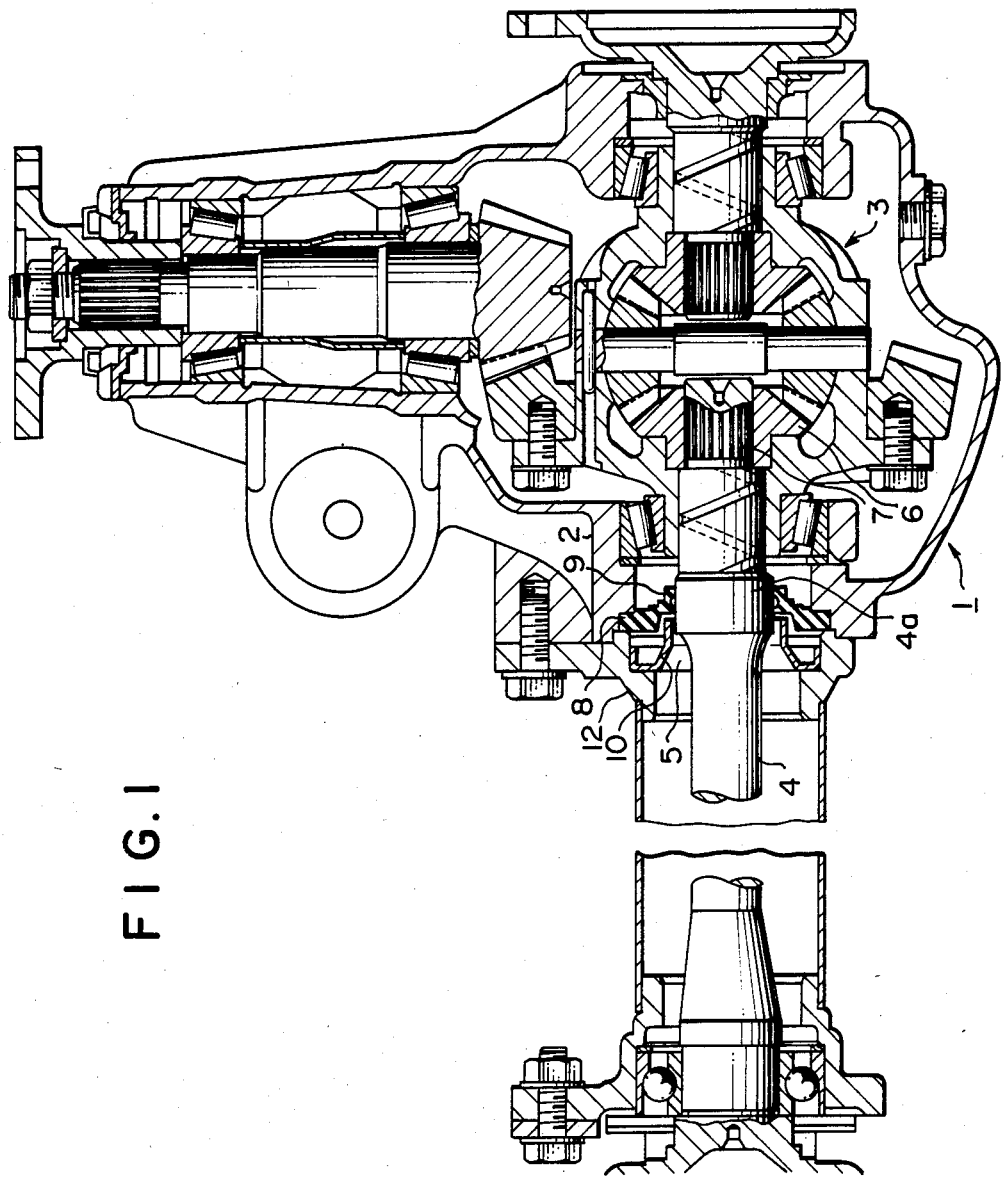
FIG. 1 is a sectional view of a final reduction gear apparatus in accordance with an embodiment of the present invention.

FIG. 1 illustrates a final reduction gear apparatus in one preferred embodiment of the present invention. 1 refers generally to the entire final reduction gear apparatus. 2 is a differential carrier which internally holds a gear assembly 3. In FIG. 1, at the left end of the differential carrier 2 is a side gear shaft opening 5 through which a side gear shaft 4 is inserted into the differential carrier. At the tip of the side gear shaft 4 is formed a spline 7 which engages the inside of the gear 6 in a splined connection. At the side gear shaft opening 5, an oil seal 8 which prevents leakage of oil out of the final reduction gear apparatus 1 is provided. When the side gear shaft 4 is assembled in its normal position, a main lip 9 of the oil seal 8 comes into contact with the periphery of the side gear shaft 4 at the part 4a for the oil seal.

Outside of the oil seal 8 at the side gear shaft opening 5 is installed a guide member 10 to guide the side gear shaft 4 to be pushed through the oil seal. The guide member 10 is made as a plate member worked by pressing or drawing. As seen from FIG. 2, the guide member 10 consists of an internal guide part 10a, a tapered part 10b and an external cylindrical part 10c. The guide part 10a and the tapered part 10b constitute a guide surface 11 to guide the side gear shaft 4 to be pushed therethrough. The guide member 10 is fixed by pressing its cylindrical part 10c into an extension flange 12 positioned outside of the side gear shaft opening 5. Therefore the outside surface 13 of the cylindrical part 10c constitutes a press fitting surface.

The inner diameter of the guide member 10, that is the inner diameter D of the guide part 10a is made slightly larger than the inner diameter d of the main lip 9 of the oil seal 8. The difference D−d is smaller than the elastic deformability of the rubber main lip 9; therefore, when the main lip 9 is radially deformed, the deformation is sufficiently small not to cause damage to the main lip 9. Besides, the guide part 10a is positioned concentric to the main lip 9 and accordingly the guide surface 11 is also concentric to the main lip 9.

Figure 2:
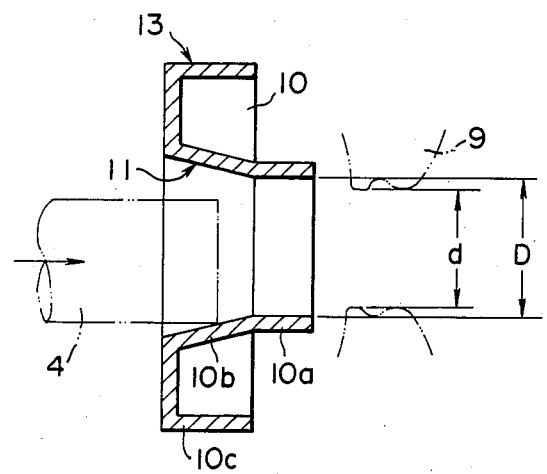
FIG. 2 is an enlarged sectional view of the guide member of the apparatus in FIG. 1.

In the apparatus thus constituted, when the side gear shaft 4 is pushed into the side gear shaft opening 5, as shown in FIG. 2, the tip of the side gear shaft 4 will be guided along the guide surface 11 formed by the tapered part 10b. Since the inner diameter at the entrance to the tapered part 10b is larger than the inner diameter D of the guide part 10a, the tip of the side gear shaft 4 can easily be pushed along the guide surface 11 of the tapered part 10b. Since the guide surface 11 is formed concentric to the side gear shaft opening 5 and the main lip 9 of the oil seal 8, the side gear shaft 4 can be easily and approximately exactly centered relative to the side gear shaft opening 5 and the main lip 9 by merely pushing the side gear shaft 4 along the guide surface 11.

When further pushed in, the tip of the side gear shaft 4 moves along the guide surface 11 of the tapered part 10b until it reaches the guide surface 11 of the guide part 10a. Since the guide surface 11 of the guide part 10a is also concentric to the main lip 9 of the oil seal 8 and the difference between the inner diameter D of the guide part 10a and the inner diameter d of the main lip 9 is small, the side gear shaft 4 can be easily and exactly centered by simply continuing to push the side gear shaft 4.

With further progress of the pushing side gear shaft 4, the tip of the side gear shaft 4 contacts the main lip 9, but since the side gear shaft 4 is being guided along the guide surface 11, the interference between the side gear shaft 4 and the main lip 9 is at most less than ½ of (D−d). Since the value of D−d is set small, the elastic deformation of the main lip 9 due to interference with the side gear shaft 4 is held small enough to fit within the limit of its elastic deformability. Accordingly damage to the main lip can be reliably avoided.

The same is true with the case illustrated in FIG. 1 when the side gear shaft 4 is further pushed and the part 4a for the oil seal reaches the main lip 9.

Figure 3:
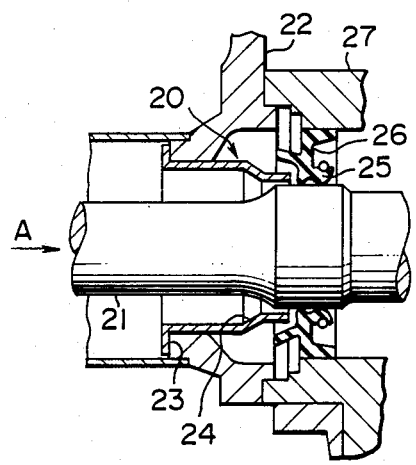
FIG. 3 is a partial sectional view of a final reduction gear apparatus in accordance with another embodiment of the present invention.

FIG. 3 illustrates another embodiment of the invention. In this embodiment the guide member 20 is provided, in the direction of movement A of the side gear shaft 21, with an engaging surface 23 to engage the guide member 20 against the upstream end of the extension flange 22. Just as in the aforementioned embodiment, the guide member 20 has a guide surface 24 which has a part parallel to the direction of movement A of the side gear shaft and a part tapered in that direction. The guide member 20 is pushed into the extension flange 22 from the left side in FIG. 3. The oil seal 26 with the main lip 25 is attached to the differential carrier 27. When the side gear shaft 21 is pushed in, the side gear shaft 21 slides along the guide surface 24 and thereby a force acts on the guide member 20 in the direction of movement A of the side gear shaft 21. With the above arrangement, on account of said engaging surface 23, slippage of the guide member 20 in the direction of movement A of the side gear shaft can be easily prevented.

Figure 4:
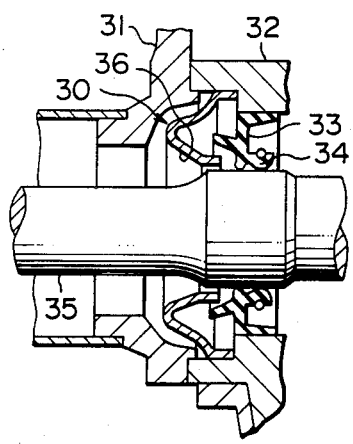
FIG. 4 is a partial sectional view of a final reduction gear apparatus in accordance with a further embodiment of the present invention.

Next, FIG. 4 illustrates another embodiment of the invention. In this embodiment, the guide member 30 is directly pressed into the differential carrier 32, instead of being pressed into the extension flange 31. In this way the concentricity between the guide surface 36 of the guide member 30 and the main lip 34 of the oil seal 33 can be enhanced. It is possible to reduce the difference between the diameter of the guide member 30 and the diameter of the main lip 34 by the same extent that said concentricity is enhanced. Accordingly the interference between the side gear shaft 35 and the main lip 34 can be correspondingly reduced.

Figure 5:
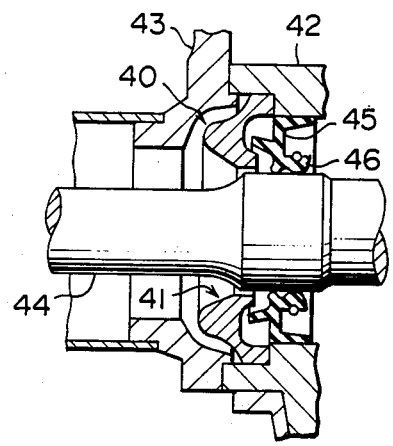
FIG. 5 is a partial sectional view of a final reduction gear apparatus in accordance with a further embodiment of the invention.

Next, another embodiment of the invention is illustrated in FIG. 5. In this embodiment, the guide member 40 consists of a block-like member with the guide surface 41. In FIG. 5, the guide member 40 is pressed into the differential carrier 42, but it may instead be pressed into the extension flange 43. Since the guide member 40 is formed as a block member, it has an increased strength. Therefore, when the side gear shaft 44 is pushed in, the radial relation between the periphery of the side gear shaft 44 to be guided along the guide surface 41 and the main lip 46 of the oil seal 45 can be accurately maintained at the desirable value.

Figure 6:
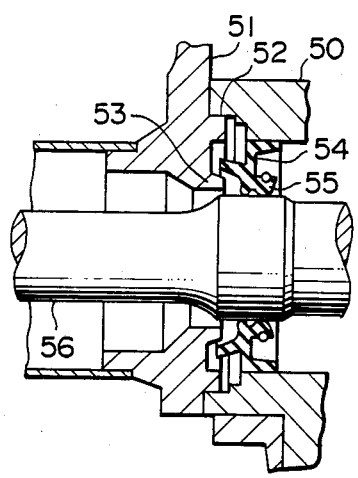
FIG. 6 is a partial sectional view of a final reduction gear apparatus in accordance with yet a further embodiment of the present invention.

FIG. 6 illustrates another embodiment of the invention. In this embodiment, the guide member is integrated with the extension flange 51 installed outside of the differential carrier 50. Since the surface 52 of the extension flange 51 is fitted into the differential carrier 50, the integrated guide member 53 can be set exactly concentric to the main lip 55 of the oil seal 54 fitted to the differential carrier 50. Accordingly the side gear shaft 56 can be exactly centered relative to the main lip 55 too. In this way, integration of the guide member 53 with the extension flange 51 facilitates the manufacture of the device.

As described in the above, the present invention can assure exact and easy centering of the side gear shaft to the side gear shaft opening it can assure normal anti-leak performance of the oil seal by preventing damage to the main lip due to interference between side gear shaft and main lip of oil seal; and at the same time it can facilitate the assembling of the side gear shaft.

Although only preferred embodiments of the present invention have been described in detail, it will be appreciated by those skilled in the art that various modifications and alterations can be made to the particular embodiments shown without materially departing from the novel teachings and advantages of the invention. Accordingly, it is to be understood that all such modifications and alterations are included within the scope of the invention as defined by the following claims.

What we claim is:

1. A final reduction gear apparatus comprising:
   a differential carrier which houses a gear assembly;
   an oil seal attached to a side gear shaft opening in said differential carrier, said oil seal having a main lip which may contact a periphery of a side gear shaft; and
   a guide member located outside of said oil seal at said side gear shaft opening, said guide member being formed as a member separate from said oil seal, said guide member having a slightly larger inner diameter than that of said main lip of said oil seal, and having guide surface concentric to said main lip, wherein ½ of the difference between the inner diameter of the guide member and the inner diameter of said main lip of said oil seal is within the limit of the elastic deformability of said main lip.

2. The final reduction gear apparatus of claim 1, wherein said guide surface of said guide member has a surface parallel to a direction of insertion of said side gear shaft into said differential carrier and wherein said guide surface has a surface tapered in said direction.

3. The final reduction gear apparatus of claim 1, wherein the periphery of said guide member constitutes a press fitting surface.

4. The final reduction gear apparatus of claim 1, wherein said guide member has an engaging surface which engages said differential carrier and prevents movement of said guide member in a direction of insertion of said side gear shaft into said differential carrier.

5. The final reduction gear apparatus of claim 1, wherein said guide member is fitted to an extension flange fixed to said differential carrier outside of said side gear shaft openig in said differential carrier.

6. The final reduction gear apparatus of claim 1, wherein said guide member is attached to said differential carrier.

7. The final reduction gear apparatus of claim 1, wherein said guide member consists of a plate member on which a guide surface is formed.

8. The final reduction gear apparatus of claim 1, wherein said guide member consists of a block member on which a guide surface is formed.

9. The final reduction gear apparatus of claim 1, wherein said guide member is integrated to an extension flange fixed to said differential carrier outside of said side gear shaft opening in said differential carrier.

10. The final reduction gear apparatus of claim 1 in combination with said side gear shaft.

* * * * *